(12) United States Patent
Kaga et al.

(10) Patent No.: US 11,063,310 B2
(45) Date of Patent: Jul. 13, 2021

(54) BATTERY CASE AND METAL-AIR BATTERY HAVING SAME

(71) Applicant: SHARP KABUSHIKI KAISHA, Sakai (JP)

(72) Inventors: Masaki Kaga, Sakai (JP); Toyoka Aimoto, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 139 days.

(21) Appl. No.: 16/461,095

(22) PCT Filed: Dec. 22, 2017

(86) PCT No.: PCT/JP2017/046248
§ 371 (c)(1),
(2) Date: May 15, 2019

(87) PCT Pub. No.: WO2018/123909
PCT Pub. Date: Jul. 5, 2018

(65) Prior Publication Data
US 2020/0075903 A1     Mar. 5, 2020

(30) Foreign Application Priority Data

Dec. 27, 2016  (JP) .............................. JP2016-253971

(51) Int. Cl.
*H01M 50/10*    (2021.01)
*H01M 12/08*    (2006.01)

(52) U.S. Cl.
CPC ........... *H01M 50/10* (2021.01); *H01M 12/08* (2013.01)

(58) Field of Classification Search
None
See application file for complete search history.

(56) References Cited

FOREIGN PATENT DOCUMENTS

| JP | 58089772 A | * | 5/1983 | ............ H01M 12/06 |
| JP | S58-089772 A | | 5/1983 | |
| JP | 2004-288572 A | | 10/2004 | |

* cited by examiner

*Primary Examiner* — Daniel S Gatewood
(74) *Attorney, Agent, or Firm* — ScienBiziP, P.C.

(57) ABSTRACT

A battery case containing an electrode group including an air electrode and a separator includes main walls on which the air electrode is opposingly disposed and a surrounding portion that is disposed at marginal portions of the main walls and that surrounds a side edge portion of the opposingly disposed air electrode. The surrounding portion is covered by an edge portion of the separator disposed opposing the air electrode.

12 Claims, 8 Drawing Sheets

BATTERY CASE AND METAL-AIR BATTERY HAVING SAME

TECHNICAL FIELD

The following disclosure relates to a battery case containing an electrode group including at least an air electrode and a separator and to a metal-air battery including the battery case.

BACKGROUND ART

A metal-air battery includes an air electrode (positive electrode), a metal negative electrode (negative electrode), and an electrolyte layer (electrolytic solution) (see, for example, PTL 1).

PTL 1 discloses a metal-air battery that includes a positive electrode, a negative electrode, and a separator interposed therebetween and that is contained in an outer container formed of laminate sheets made of composite synthetic resin films. The outer container is formed of a positive-electrode-side laminate sheet and a negative-electrode-side laminate sheet. At least one layer of the positive-electrode-side laminate sheet has one or more air holes, and at least one layer is a water-repellent film.

CITATION LIST

Patent Literature

PTL 1: Japanese Unexamined Patent Application Publication No. 2004-288572

SUMMARY OF INVENTION

Technical Problem

In a metal-air battery having the above-described configuration, a positive electrode, a negative electrode, and a separator between the positive electrode and the negative electrode are not fixed in an outer container, and thus the positive electrode and the negative electrode may disadvantageously short-circuit, for example, when the separator is displaced.

The present disclosure has been made to solve this problem, and an object thereof is to provide a battery case having a structure in which a separator reliably covers an air electrode so that short-circuiting can be prevented if a positive electrode, a negative electrode, the separator, and others are not fixed in a battery case (outer container), and to provide a metal-air battery including such a battery case.

Solution to Problem

To achieve the above object, a battery case of the present disclosure contains an electrode group including an air electrode and a separator and is configured so as to include a main wall on which the air electrode is oppositely disposed and a surrounding portion that is disposed at a marginal portion of the main wall and that surrounds a side portion of the opposingly disposed air electrode, the surrounding portion being covered by an edge portion of the separator disposed opposing the air electrode.

With this configuration, the surrounding portion provided in the battery case surrounds the air electrode, and the separator disposed opposing the air electrode covers the surrounding portion, whereby an electrode disposed on the opposite side of the separator from the air electrode and the air electrode are reliably separated from each other, and short-circuiting cannot occur between the electrodes.

The battery case of the present disclosure may be configured such that the surrounding portion is a protrusion that surrounds a part of a side surface of the air electrode and that is thicker than the air electrode in a thickness direction of the air electrode.

The battery case of the present disclosure may be configured so as to include a side wall extending perpendicularly from the marginal portion of the main wall and such that the surrounding portion is a support plate extending from the side wall in parallel to the main wall and that the side portion of the air electrode is interposed between the support plate and the main wall.

The battery case of the present disclosure may be configured such that a plurality of holes are provided in the main wall, a water-repellent film is disposed between the plurality of holes and the air electrode, and an edge portion of the water-repellent film is held between the surrounding portion and the main wall.

The battery case of the present disclosure may be configured such that the surrounding portion causes a gap to be formed between the air electrode and the separator disposed opposing each other.

The battery case of the present disclosure may be configured such that a plurality of holes are provided in the main wall, a water-repellent film is disposed between the plurality of holes and the air electrode, and an edge portion of the water-repellent film and an edge portion of the air electrode are superposed on each other and held between the surrounding portion and the main wall.

The battery case of the present disclosure may be configured such that a part of the edge portion of the air electrode is thinner than a central part of the air electrode in the thickness direction of the air electrode, and the part of the edge portion of the air electrode is held between the surrounding portion and the main wall.

The battery case of the present disclosure may be configured to further include a collecting electrode disposed in the gap between the air electrode and the separator.

A metal-air battery of the present disclosure includes a battery case, the air electrode, the separator, and a first electrode opposing the separator on the opposite side from the air electrode.

In the case where the metal-air battery is a primary battery, the first electrode is a metal negative electrode, and in the case where the metal-air battery is a secondary battery, the first electrode is an oxygen-generating electrode.

The metal-air battery of the present disclosure is configured to further include a second electrode opposing the first electrode on the opposite side from the air electrode. The metal-air battery having this configuration is a secondary battery; therefore, the first electrode is an oxygen-generating electrode, and the second electrode is a metal negative electrode. Alternatively, the first electrode may be a metal negative electrode, and the second electrode may be an oxygen-generating electrode.

Advantageous Effects of Invention

According to the present disclosure, the surrounding portion provided in the battery case surrounds the air electrode, and the separator disposed opposing the air electrode covers the surrounding portion, whereby the electrode disposed on the opposite side of the separator from the air electrode and the air electrode are separated (insulated) from each other, and thus short-circuiting between the electrodes can be reduced.

DESCRIPTION OF EMBODIMENTS

Embodiments of the present disclosure will hereinafter be described with reference to the drawings.

<Description of Basic Configuration of Metal-Air Battery>

Figure 1:
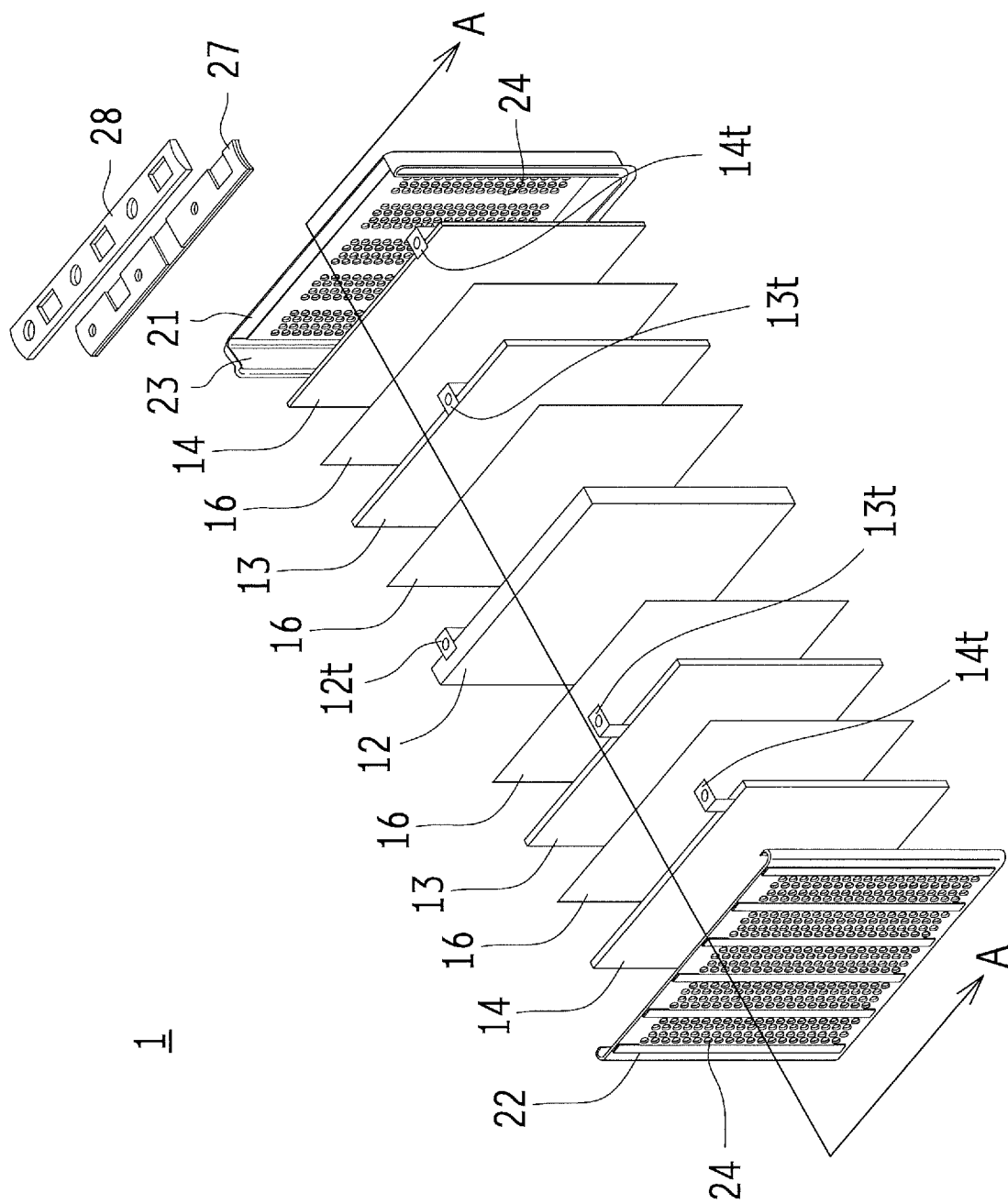
FIG. 1 is a schematic perspective view illustrating an example of a basic configuration of a metal-air battery including a battery case of the present disclosure.
Figure 2:
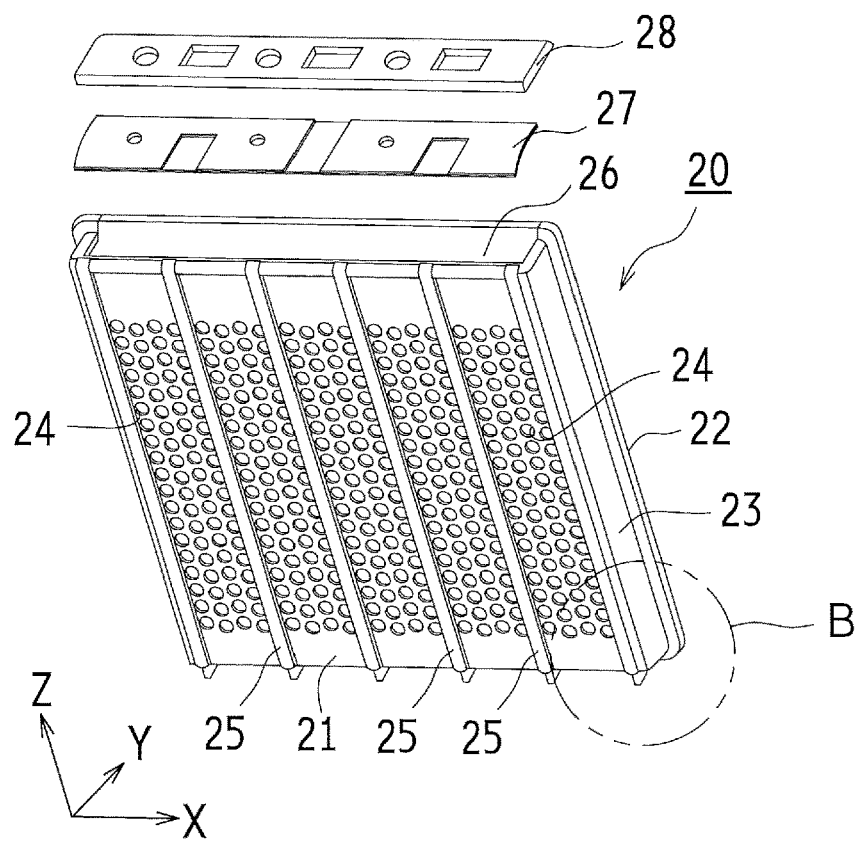
FIG. 2 is a schematic exploded perspective view illustrating components of the basic configuration of the metal-air battery.
Figure 3:
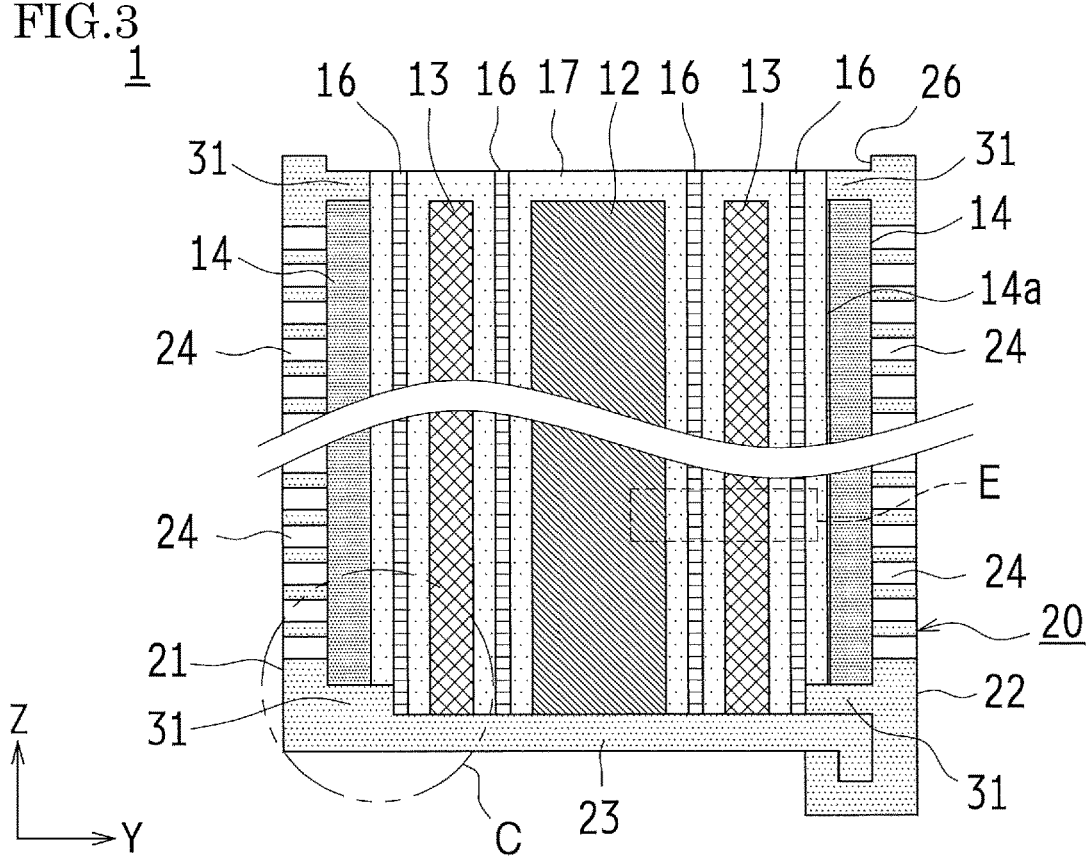
FIG. 3 is a schematic sectional view taken along line A-A in FIG. 1.

FIG. 1 is a schematic perspective view illustrating an example of a basic configuration of a metal-air battery 1 including a battery case 20 according to a first embodiment of the present disclosure. FIG. 2 is a schematic exploded perspective view illustrating components of the basic configuration of the metal-air battery. FIG. 3 is a schematic sectional view taken along line A-A in FIG. 1. It should be noted that FIG. 3 is a schematic sectional view illustrated to be wider than the actual dimensions in order to make it easy to understand the internal configuration.

The metal-air battery 1 according to the embodiment is illustrated as a three-electrode metal-air secondary battery constituted by a metal negative electrode 12 containing a metal serving as an electrode active material, an oxygen-generating electrode 13 used as a positive electrode during charge, an air electrode 14 used as a positive electrode during discharge, and separators (separating films) 16 interposed between the metal negative electrode 12 and the oxygen-generating electrode 13 and between the oxygen-generating electrode 13 and the air electrode 14, the electrodes being disposed in parallel with at least portions thereof immersed in an electrolytic solution 17 in a battery case (housing) 20.

That is, in the metal-air battery 1 according to the embodiment, the metal negative electrode 12, the oxygen-generating electrode 13, and the air electrode 14 are disposed in parallel in the battery case 20 with the separator 16 interposed between each pair of electrodes. Although the metal-air battery 1 according to the embodiment has a structure in which each pair of electrodes has a liquid layer of the electrolytic solution 17 therebetween, the metal-air battery 1 may also have a structure in which each pair of electrodes are in contact with each other (i.e., a structure in which there is no liquid layer between electrodes).

The metal-air battery 1 is applicable, for example, to zinc-air batteries, lithium-air batteries, sodium-air batteries, calcium-air batteries, magnesium-air batteries, aluminum-air batteries, and iron-air batteries. In particular, the metal-air battery 1 can be suitably used for a zinc-air battery, in which a zinc species is used as a metal negative electrode. Zinc-air batteries have the advantage of being highly safe because they do not have to use flammable electrolytic solutions (electrolytes) unlike, for example, lithium-air batteries and can use alkaline electrolytic solutions (electrolytes). Zinc-air batteries also have the advantage of easily achieving increases in capacity because their negative electrodes can be produced less expensively than negative electrodes of lithium-air batteries.

In the metal-air cell 1 according to the embodiment, the oxygen-generating electrode 13 is disposed between the air electrode 14 and the metal negative electrode 12, as shown in FIG. 2 and FIG. 3. During discharge, discharge between the air electrode 14 and the metal negative electrode 12 is carried out without being inhibited by the oxygen-generating electrode 13, and during charge, charge is carried out between the oxygen-generating electrode 13 and the metal negative electrode 12.

Although the oxygen-generating electrode 13 and the air electrode 14 are each provided on both sides of the metal negative electrode 12 in FIG. 2 and FIG. 3, the oxygen-generating electrode 13 and the air electrode 14 may be provided only on either side of the metal negative electrode 12. That is, the metal negative electrode 12, the oxygen-generating electrode 13, and the air electrode 14 can be used in both double-sided and single-sided manners. The electrodes are disposed in the order of the metal negative electrode 12, the oxygen-generating electrode 13, and the air electrode 14 or in the order of the oxygen-generating electrode 13, the metal negative electrode 12, and the air electrode 14.

Next, components of the metal-air battery 1 will be described in detail.

(Description of Air Electrode 14)

The air electrode 14 is a porous electrode having oxygen-reducing capacity and serving as a positive electrode during discharge. The air electrode 14 may include a porous gas diffusion layer and a porous air-electrode catalyst layer provided on the gas diffusion layer and containing a catalyst having oxygen-reducing capacity.

In the air electrode 14, when an alkaline aqueous solution is used as the electrolytic solution, a discharge reaction in which water supplied from, for example, the electrolytic solution, oxygen gas supplied from the atmosphere, and electrons react together occurs on an air-electrode catalyst having oxygen-reducing capacity to form hydroxide ions (OH—). That is, in the air electrode 14, a discharge reaction proceeds at a three-phase interface where oxygen (gas phase), water (liquid phase), and an electron conductor (solid phase) coexist.

The air electrode 14 is provided so as to be able to diffuse oxygen gas contained in the atmosphere. For example, the air electrode 14 can be provided such that at least a part of a surface of the air electrode 14 is exposed to the atmosphere. In the metal-air battery 1 shown in FIG. 2 and FIG. 3, the battery case 20 described below is provided with air inlets 24 so that oxygen gas contained in the atmosphere can be diffused into the air electrode 14 through the air inlets 24. Water may be supplied to the air electrode 14 through the air inlets 24.

The air-electrode catalyst layer may contain, for example, a conductive porous support and an air-electrode catalyst supported on the porous support and having oxygen-reducing capacity. This enables a three-phase interface where oxygen gas, water, and electrons coexist to be formed on the air-electrode catalyst, thus allowing a discharge reaction to proceed. The air-electrode catalyst layer may contain a binder. The binder may be a water-repellent resin. By using a water-repellent resin as the binder, leakage of the electrolytic solution through the air electrode 14 can be reduced. The water-repellent resin is, for example, polytetrafluoroethylene (PTFE).

The air electrode 14 constituted by the air-electrode catalyst layer and the gas diffusion layer may be produced by applying or stacking a porous support supporting an air-electrode catalyst to or on a water-repellent porous substrate (the gas diffusion layer). The gas diffusion layer may function as an air-electrode current collector. In this case, the gas diffusion layer is, for example, a sheet of carbon paper or carbon cloth surface-treated with a water-repellent resin or a porous sheet made of carbon black and a water-repellent resin. The water-repellent resin is provided in order to prevent leakage of the electrolytic solution and has a gas-liquid separation function. That is, the water-repellent resin prevents the electrolytic solution from leaking out of the battery case 20 and does not impede the supply of oxygen gas to the air-electrode catalyst layer.

The air electrode 14 may further include an air-electrode current collector 14a (see FIG. 3) in addition to the air-electrode catalyst layer and the gas diffusion layer. In this case, the gas diffusion layer may be an insulating, porous water-repellent resin sheet (a water-repellent film). The air-electrode current collector 14a is preferably a material being porous and having electron conductivity. When an alkaline aqueous solution is used as the electrolytic solution, it is preferable to use nickel or a material obtained by plating the surface of a metal material such as stainless steel with nickel from the viewpoint of corrosion resistance. By using mesh, expanded metal, perforated metal, sintered metal particles, sintered metal fibers, foam metal, or the like, the air-electrode current collector 14a can be porous. The air-electrode current collector 14a is preferably disposed between the air electrode catalyst layer and the separator 16.

The air electrode 14 can be electrically connected with an air-electrode terminal 14t. This allows electric charge generated in the air-electrode catalyst layer to be drawn to an external circuit (not shown).

(Description of Oxygen-Generating Electrode 13)

The oxygen-generating electrode 13 is a porous electrode having oxygen-generating capacity and serving as a positive electrode during charge. In the oxygen-generating electrode 13, when an alkaline aqueous solution is used as the electrolytic solution, a reaction (charge reaction) in which oxygen, water, and electrons are generated from hydroxide ions (OH—) occurs. That is, in the oxygen-generating electrode 13, a charge reaction proceeds at a three-phase interface where oxygen (gas phase), water (liquid phase), and an electron conductor (solid phase) coexist.

The oxygen-generating electrode 13 is provided so as to be able to diffuse oxygen gas generated as a charge reaction proceeds. For example, the oxygen-generating electrode 13 can be provided such that at least a part of the oxygen-generating electrode communicates with the outside air. In the metal-air battery 1 shown in FIG. 3, the upper part of the battery case 20 communicates with the outside air, and oxygen generated as a charge reaction proceeds is diffused through pores of the porous oxygen-generating electrode 13 and released from the upper part of the battery case 20 to the outside air.

The oxygen-generating electrode 13 is preferably a material being porous and having electron conductivity. When an alkaline aqueous solution is used as the electrolytic solution, it is preferable to use nickel or a material obtained by plating the surface of a metal material such as stainless steel with nickel from the viewpoint of corrosion resistance and catalytic ability for oxygen evolution reaction. By using mesh, expanded metal, perforated metal, sintered metal particles, sintered metal fibers, foam metal, or the like as the oxygen-generating electrode, the oxygen-generating electrode 13 can be porous. To promote a charge reaction, the oxygen-generating electrode 13 may further include on its surface catalyst particles having oxygen-generating capacity.

The oxygen-generating electrode 13 may further include an oxygen-generating-electrode current collector. The oxygen-generating-electrode current collector is preferably a material being porous and having electron conductivity.

The oxygen-generating electrode 13 can be electrically connected with an oxygen-generating-electrode terminal 13t. This allows electric charge required for a charge reaction to be supplied from an external circuit (not shown) to the oxygen-generating electrode 13.

(Description of Metal Negative Electrode 12)

The metal negative electrode 12 is an electrode made of an active material containing a metal element, and the active material undergoes an oxidation reaction during discharge and a reduction reaction during charge. Examples of the metal element include zinc, lithium, sodium, calcium, magnesium, aluminum, and iron. When the metal element is zinc, oxidation of metal zinc occurs during discharge.

Specifically, as a result of oxidization, zinc is dissolved into the electrolytic solution in the form of zincate ions or directly converted into zinc oxide and zinc hydroxide.

During charge, reduction to metal zinc occurs.

Specifically, zincate ions dissolved in the electrolytic solution are reduced to form zinc, or zinc oxide and zinc hydroxide are directly reduced to zinc.

As described above, hydroxide ions (OH—), in addition to the active material (zinc), are involved in both the discharge reaction and the charge reaction, and thus the metal negative electrode 12 needs to have a structure that allows the electrolytic solution serving as a conducting path for the active material and hydroxide ions (OH—) to efficiently come into contact. For example, when a porous electrode formed of active material particles is used as the metal negative electrode 12, the electrolytic solution permeates into interparticle spaces of the active material particles, whereby the contact interface between the active material particles and the electrolytic solution can be increased. The metal negative electrode 12 may further contain a binder. The presence of a binder enables the active materials to bind together.

The active material may be a metal in a reduced state or a metal in an oxidized state. In the case where the metal element is zinc, when in a reduced state, the active material is metal zinc, and when in an oxidized state, the active material is zinc oxide. Thus, the metal negative electrode 12 containing zinc can be taken out of the battery case 20 after discharge to reduce zinc oxide to zinc.

The metal negative electrode 12 may further include a metal-negative-electrode current collector (not shown). The metal-negative-electrode current collector is preferably a material being porous and having electron conductivity. To reduce self-corrosion, it is preferable to use a material having a high hydrogen overvoltage or a material obtained by plating the surface of a metal material such as stainless steel with a material having a high hydrogen overvoltage. By using mesh, expanded metal, perforated metal, sintered metal particles, sintered metal fibers, foam metal, or the like, the metal-negative-electrode current collector can be porous.

The metal negative electrode 12 can be electrically connected with a metal-negative-electrode terminal 12t. This allows electric charge consumed or generated in the metal negative electrode 12 to be received from or given to an external circuit (not shown).

(Description of Separator 16)

The separator 16 is for preventing short-circuiting due to the formation of an electron-conducting path between electrodes and is formed of an electronically insulating material. For example, the separator 16 inhibits metal dendrites precipitated on the metal negative electrode 12 by reduction during charge from reaching the oxygen-generating electrode 13 or the air electrode 14, thereby reducing short-circuiting.

A solid electrolyte sheet such as a porous resin sheet or an ion-exchange membrane is used as the separator 16. When the separator 16 is disposed between each pair of electrodes, the charge reaction and the discharge reaction of the battery cannot be caused if the separator 16 impedes ionic conduction, but using the materials described above allows ions to pass through the separator 16 disposed between each pair of electrodes.

(Description of Electrolytic Solution)

The electrolytic solution 17 is a liquid in which an electrolyte is dissolved in a solvent and which has ion conductivity.

The type of electrolytic solution varies depending on the type of electrode active material contained in the metal electrodes, and an electrolytic solution (aqueous electrolyte solution) in a water solvent may be used.

For example, in the case of a zinc-air battery, an aluminum-air battery, or an iron-air battery, an alkaline aqueous solution such as an aqueous sodium hydroxide solution or an aqueous potassium hydroxide solution may be used as the electrolytic solution, and in the case of a magnesium-air battery, an aqueous sodium chloride solution may be used as the electrolytic solution. In the case of a lithium-air battery, an organic electrolytic solution may be used.

The electrolytic solution may contain an organic additive or an inorganic additive in addition to the electrolyte and may be gelatinized by a polymer additive.

(Description of Battery Case 20)

The battery case 20 is a housing (outer container) containing the metal negative electrode 12, the oxygen-generating electrode 13, and the air electrode 14 that are immersed in the electrolytic solution 17 and is shaped like a hollow rectangular parallelepiped. That is, the battery case 20 has such a shape that a first main wall 21 and a second main wall 22, each having a rectangular shape, are disposed opposing each other, the first main wall 21 and the second main wall 22 being connected to each other by a side wall 23 at their three sides, i.e., left and right lateral sides and a bottom side, with their top side being opened. The battery case 20 thus formed is sized to be smaller in a thickness direction Y (the width direction of the side wall 23) than in a width direction X and a height direction Z. Specifically, the battery case 20 has dimensions of, for example, 200 mm in the width direction X (breadth), for example, 20.84 mm in the thickness direction Y (depth), and, for example, 135 mm in the height direction Z (length).

In the first main wall 21 and the second main wall 22 opposing each other, the air inlets (a plurality of holes) 24 are formed so as to communicate with insides. That is, the battery case 20 is configured to take in air through the air inlets 24. The air inlets 24 are partitioned by a plurality of crosspieces 25 provided along the width direction X or the height direction Z of the first main wall 21 and the second main wall 22. The plurality of crosspieces 25 inhibits the air electrode 14 from being bulged outward by the pressure of the electrolytic solution 17.

The top side of the battery case 20 is an electrolytic-solution inlet 26, and the electrolytic solution 17 can be supplied inside through the electrolytic-solution inlet 26. An inner lid 27 and an outer lid 28, which seal the electrolytic-solution inlet 26, are detachably mounted to the battery case 20.

The battery case 20 and the inner lid 27 may be made of any material having corrosion resistance to the electrolytic solution 17, and examples of such materials include polyvinyl chloride (PVC), polyvinyl acetate, ABS resins, vinylidene chloride, polyacetal, polyethylene, polypropylene, polyisobutylene, fluorocarbon resins, and epoxy resins.

The descriptions of the air electrode 14, the oxygen-generating electrode 13, the metal negative electrode 12, the separator 16, and the battery case 20 are completed here.

While the above embodiment has been described in the context of a three-electrode metal-air secondary battery, the oxygen-generating electrode 13 is omitted in the case of a primary battery. In the case of a two-electrode metal-air secondary battery, an air electrode 14 having both oxygen-reducing capacity and oxygen-generating capacity is used, and the oxygen-generating electrode 13 is omitted. For example, the air electrode 14 used for a two-electrode metal-air secondary battery includes not only an air-electrode catalyst but also an air-electrode catalyst layer containing catalyst particles having oxygen-generating capacity.

Figure 4:
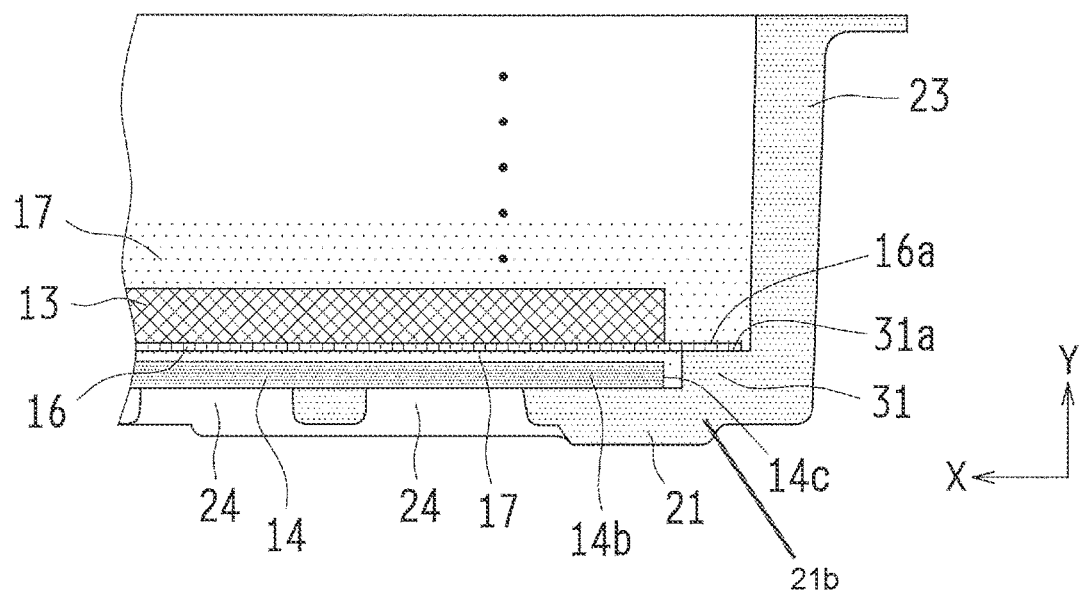
FIG. 4 is a partially enlarged schematic sectional view illustrating the structure of a battery case and the shape of a separator according to a first embodiment.

FIG. 4 is a partially enlarged schematic sectional view illustrating the structure of a battery case 20 and the shape of a separator 16 according to the first embodiment, i.e., an enlarged schematic sectional view of a circular area indicated by reference sign B in FIG. 2 and a more specific sectional view of a circular area indicated by reference sign C in FIG. 3. Although FIG. 4 illustrates only the first main wall 21 side, the second main wall 22 also has the same structure.

The battery case 20 according to the first embodiment includes, at a marginal portion 21b (the entire perimeter, in the first embodiment) of the first main wall 21 (and the second main wall 22) on which the air electrode 14 is opposingly disposed, a surrounding portion 31 which surrounds a side edge portion 14b of the opposingly disposed air electrode 14.

In the first embodiment, the surrounding portion 31 is in the form of a stepped protrusion that surrounds only a side surface 14c of the air electrode 14 and that is thicker than the air electrode 14 in the thickness direction Y of the air electrode 14. That is, the surrounding portion (protrusion) 31 is shaped like a rectangular frame and has a structure that allows the air electrode 14 to fit into the surrounding portion (protrusion) 31 shaped like a frame.

The separator 16 is formed to be one size larger than the air electrode 14, and when the separator 16 is disposed opposing the air electrode 14, a marginal portion 16a of the separator 16 is placed on an upper surface 31a of the surrounding portion (protrusion) 31, as viewed in the drawing plane of FIG. 4. That is, the air electrode 14 is completely covered by the surrounding portion (protrusion) 31, the separator 16, and the marginal portion 16a thereof. The dimensions of the separator 16 are set such that the separator 16, if displaced a little in the battery case 20, will not come off the upper surface 31a of the surrounding portion (protrusion) 31.

Therefore, if the oxygen-generating electrode 13 or the metal negative electrode 12 (in the case of a primary battery) is opposingly disposed on the separator 16, the air electrode 14 and the oxygen-generating electrode 13 or the metal negative electrode 12 will completely be separated by the separator 16 and the surrounding portion (protrusion) 31, and the air electrode 14 and the oxygen-generating electrode 13 or the metal negative electrode 12 will not come into contact with each other to cause short-circuiting if any of the electrodes (the air electrode 14, the oxygen-generating electrode 13, and the metal negative electrode 12) or the separator 16 is displaced in the battery case 20.

By setting the thickness of the surrounding portion (protrusion) 31 to be larger than the thickness of the air electrode 14, a gap is formed between the air electrode 14 and the separator 16, and a layer of the electrolytic solution 17 is formed in the gap. This facilitates diffusion of by-products (ions) of a discharge reaction in the air electrode 14 and thus can reduce resistance during the discharge reaction in the air electrode 14.

By forming the surrounding portion 31 in the form of a protrusion at the marginal portion 21b of the first main wall 21, the first main wall 21 is reinforced to have higher resistance to internal pressure.

Although the surrounding portion (protrusion) 31 is formed around the entire perimeter of the marginal portion 21b of the first main wall 21 (and the second main wall 22) in the first embodiment, the surrounding portion 31 need not necessarily be formed around the entire perimeter and may be provided at multiple locations on each side of the first main wall 21 (and the second main wall 22). For example, the surrounding portion 31 may be provided at three locations, two corners and the central part, on each side. This applies to the following embodiments.

Second Embodiment

Figure 5:
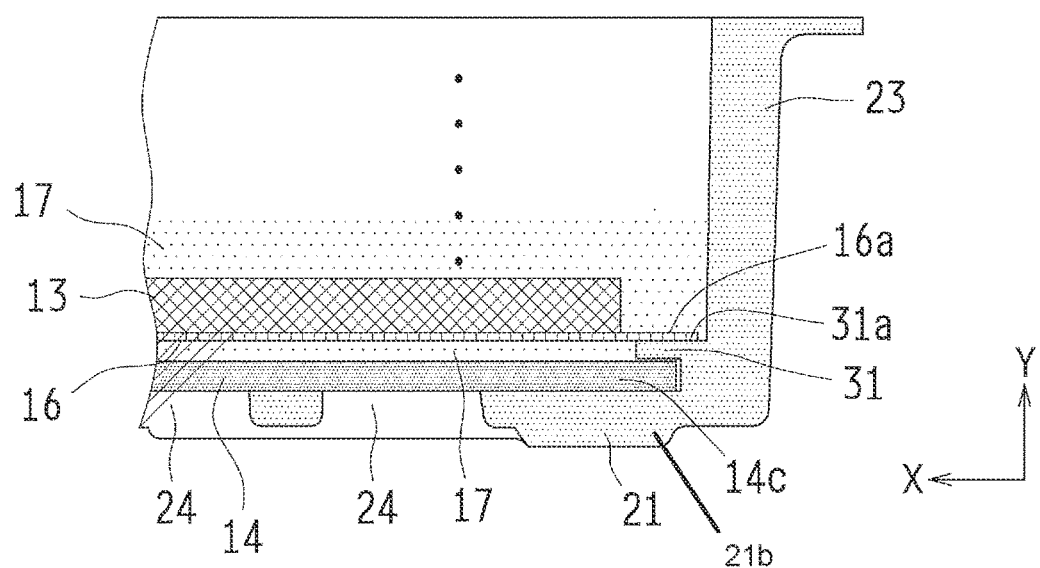
FIG. 5 is a partially enlarged schematic sectional view illustrating the structure of a battery case and the shape of a separator according to a second embodiment.

FIG. 5 is a partially enlarged schematic sectional view illustrating the structure of a battery case 20 and the shape of a separator 16 according to a second embodiment, i.e., an enlarged schematic sectional view of the circular area indicated by reference sign B in FIG. 2. Although FIG. 5 illustrates only the first main wall 21 side, the second main wall 22 also has the same structure.

The battery case 20 according to the second embodiment includes, at a marginal portion 21b (the entire perimeter, in the second embodiment) of the first main wall 21 (and the second main wall 22) on which the air electrode 14 is opposingly disposed, the surrounding portion 31 which surrounds the side edge portion 14b of the opposingly disposed air electrode 14.

In the second embodiment, the battery case 20 includes the side wall 23 extending perpendicularly from the marginal portion 21b of the first main wall 21, and the surrounding portion 31 is a support plate extending from the side wall 23 in parallel to the first main wall 21. The side edge portion 14b of the air electrode 14 is interposed between the surrounding portion (support plate) 31 and the first main wall 21 and held from both sides.

The separator 16 is formed to be one size larger than the air electrode 14, and when the separator 16 is disposed opposing the air electrode 14, the marginal portion 16a of the separator 16 is placed on the upper surface 31a of the surrounding portion (support plate) 31, as viewed in the drawing plane of FIG. 5. That is, the air electrode 14 is completely covered by the surrounding portion (support plate) 31 and the separator 16. The dimensions of the separator 16 are set such that the separator 16, if displaced a little in the battery case 20, will not come off the upper surface 31a of the surrounding portion (support plate) 31.

Therefore, if the oxygen-generating electrode 13 or the metal negative electrode 12 (in the case of a primary battery) is opposingly disposed on the separator 16, the air electrode 14 and the oxygen-generating electrode 13 or the metal negative electrode 12 will completely be separated by the separator 16 and the surrounding portion (support plate) 31, and the air electrode 14 and the oxygen-generating electrode 13 or the metal negative electrode 12 will not come into contact with each other to cause short-circuiting if any of the electrodes (the air electrode 14, the oxygen-generating electrode 13, and the metal negative electrode 12) or the separator 16 is displaced in the battery case 20.

A gap is formed between the air electrode 14 and the separator 16 by the thickness of the surrounding portion (support plate) 31, and a layer of the electrolytic solution 17 is formed in the gap. This facilitates diffusion of by-products (ions) of a reaction in the air electrode 14 and thus can reduce resistance during the reaction in the air electrode 14.

In the second embodiment, the side edge portion 14b of the air electrode 14 is wrapped and covered on three sides by the surrounding portion (support plate) 31, the side wall 23, and the first main wall 21. This structure can reduce or prevent the electrolytic solution 17 from running along the side edge portion 14b of the air electrode 14 to leak out. In this case, integrating the surrounding portion (support plate) 31 with the side edge portion 14b of the air electrode 14 by insert molding can make it more difficult for the electrolytic solution 17 to leak out.

By forming the surrounding portion (support plate) 31 in the form of a projection at the marginal portion of the side wall 23, the first main wall 21 and the side wall 23 are reinforced to have higher resistance to internal pressure.

Third Embodiment

Figure 6:
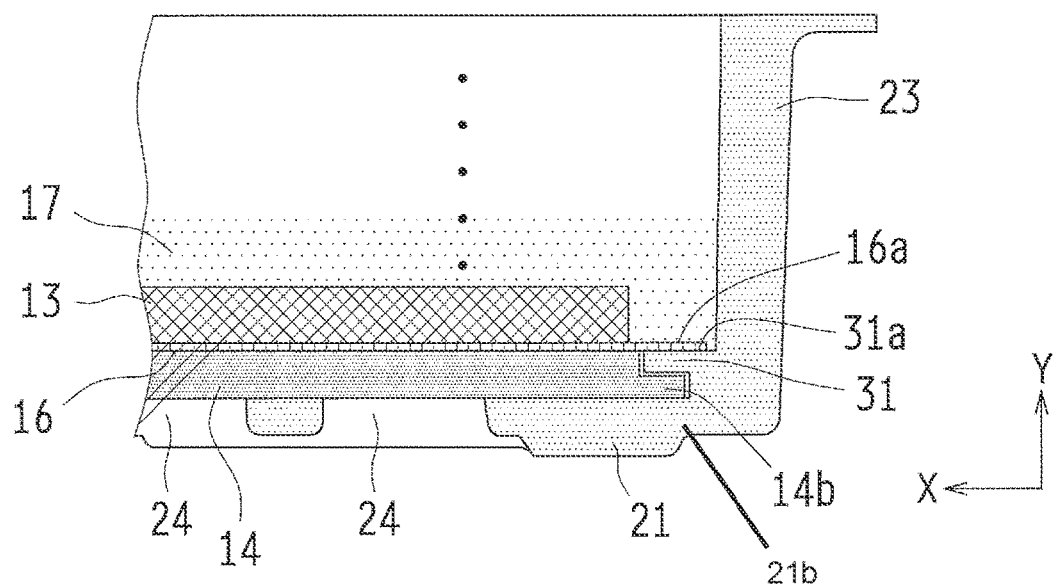
FIG. 6 is a partially enlarged schematic sectional view illustrating the structure of a battery case and the shape of a separator according to a third embodiment.

FIG. 6 is a partially enlarged schematic sectional view illustrating the structure of a battery case 20 and the shape of a separator 16 according to a third embodiment, i.e., an enlarged schematic sectional view of the circular area indicated by reference sign B in FIG. 2. Although FIG. 6 illustrates only the first main wall 21 side, the second main wall 22 also has the same structure.

The structure of the battery case 20 according to the third embodiment is the same as the structure of the battery case 20 according to the second embodiment (see FIG. 5). The difference is that in the second embodiment, the gap is formed between the air electrode 14 and the separator 16 by the thickness of the surrounding portion (support plate) 31, whereas in the third embodiment, the air electrode 14 is formed in the gap portion to be thicker by the gap thickness, and the air electrode 14 and the separator 16 are in contact (or close contact) with each other.

Fourth Embodiment

Figure 7:
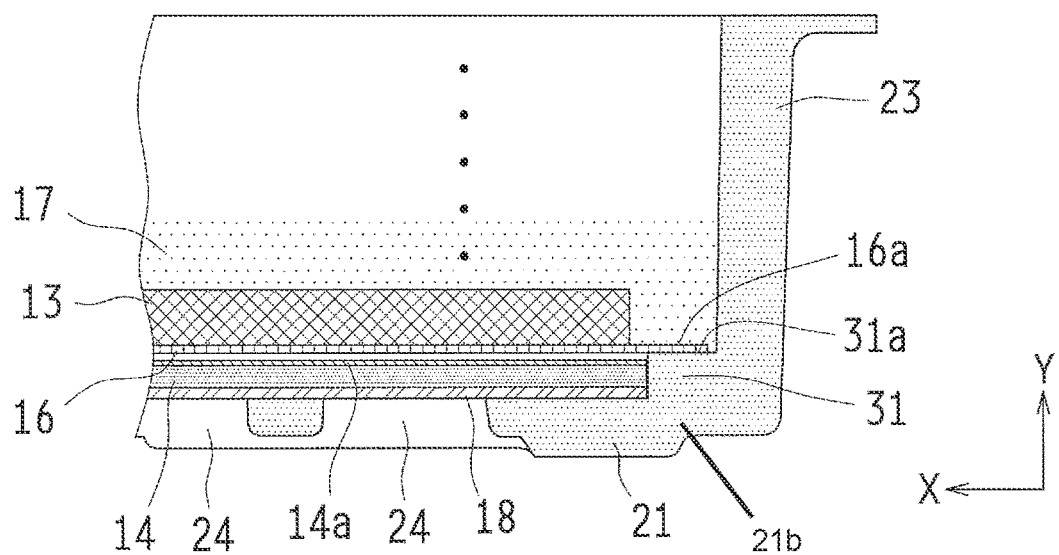
FIG. 7 is a partially enlarged schematic sectional view illustrating the structure of a battery case and the shape of a separator according to a fourth embodiment.

FIG. 7 is a partially enlarged schematic sectional view illustrating the structure of a battery case 20 and the shape of a separator 16 according to a fourth embodiment, i.e., an enlarged schematic sectional view of the circular area indicated by reference sign B in FIG. 2. Although FIG. 7 illustrates only the first main wall 21 side, the second main wall 22 also has the same structure.

The structure of the battery case 20 according to the fourth embodiment is the same as the structure of the battery case 20 according to the first embodiment (see FIG. 4). The difference is that a water-repellent film 18 is disposed between the air electrode 14 and the plurality of holes (the air inlets 24) in the first main wall 21 (and the second main wall 22). The water-repellent film 18 may be any film having air permeability and water-repellency, and typically, the insulating, porous water-repellent resin sheet used for the air electrode 14 may be used.

In the fourth embodiment, the air-electrode current collector 14a is bonded to a surface of the air electrode 14 facing away from the water-repellent film 18. The air electrode 14 may have a structure in which air electrodes are bonded to opposite surfaces of the air-electrode current collector 14a.

According to the fourth embodiment, the water-repellent film 18 disposed between the air electrode 14 and the plurality of holes (the air inlets 24) of the first main wall 21 can prevent the electrolytic solution 17 from leaking out of the battery case 20 through the air inlets 24.

Fifth Embodiment

Figure 8:
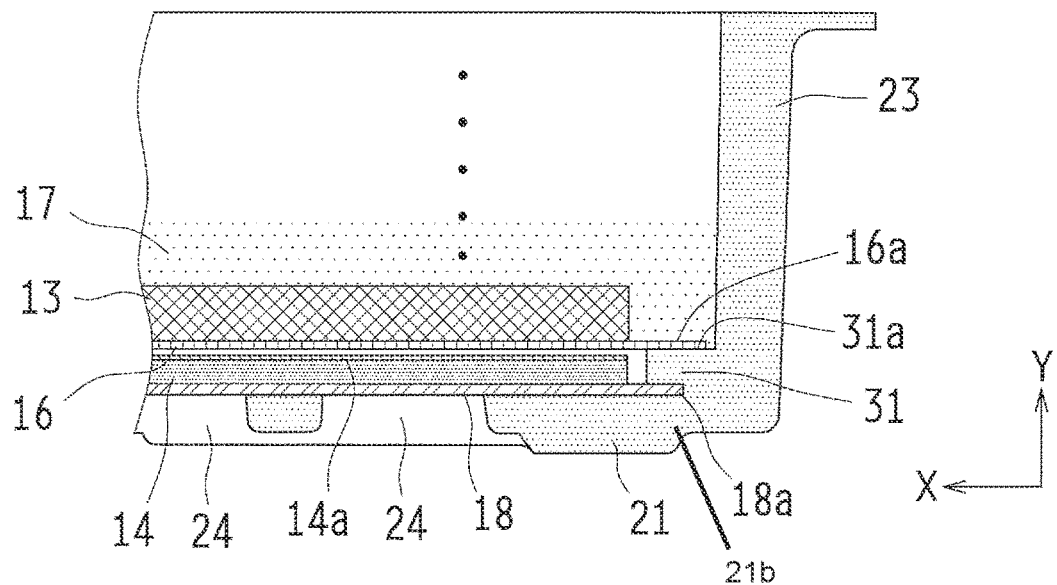
FIG. 8 is a partially enlarged schematic sectional view illustrating the structure of a battery case and the shape of a separator according to a fifth embodiment.

FIG. 8 is a partially enlarged schematic sectional view illustrating the structure of a battery case 20 and the shape of a separator 16 according to a fifth embodiment, i.e., an enlarged schematic sectional view of the circular area indicated by reference sign B in FIG. 2. Although FIG. 8 illustrates only the first main wall 21 side, the second main wall 22 also has the same structure.

The structure of the battery case 20 according to the fifth embodiment is substantially the same as the structure of the battery case 20 according to the fourth embodiment (see FIG. 7), but different in that a side edge portion (marginal portion) 18a of the water-repellent film 18 is embedded under the surrounding portion 31 in the form of a protrusion (i.e., held between the surrounding portion 31 and the first main wall 21). Thus, the water-repellent film 18 is shaped to be larger than the water-repellent film 18 in the battery case 20 according to the fourth embodiment.

As described above, in the fifth embodiment, the side edge portion 18a of the water-repellent film 18 is wrapped and covered on three sides by the surrounding portion 31, the side wall 23, and the first main wall 21. This structure can reduce or prevent the electrolytic solution 17 from running along the side edge portion 18a of the water-repellent film 18 to leak out through the air inlets 24. In this case, integrating the surrounding portion (support plate) 31 with the side edge portion 18a of the water-repellent film 18 by insert molding can make it more difficult for the electrolytic solution 17 to leak out.

Sixth Embodiment

Figure 9:
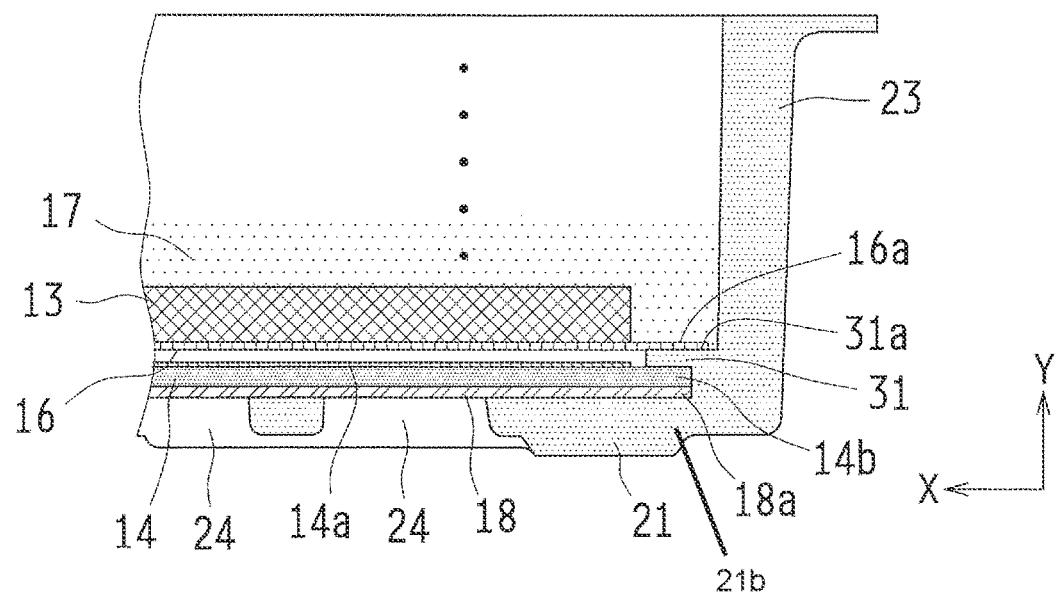
FIG. 9 is a partially enlarged schematic sectional view illustrating the structure of a battery case and the shape of a separator according to a sixth embodiment.

FIG. 9 is a partially enlarged schematic sectional view illustrating the structure of a battery case 20 and the shape of a separator 16 according to a sixth embodiment, i.e., an enlarged schematic sectional view of the circular area indicated by reference sign B in FIG. 2. Although FIG. 9 illustrates only the first main wall 21 side, the second main wall 22 also has the same structure.

The structure of the battery case 20 according to the sixth embodiment is substantially the same as the structure of the battery case 20 according to the second embodiment (see FIG. 5), but different in that the water-repellent film 18 is disposed between the air electrode 14 and the plurality of holes (the air inlets 24) in the first main wall 21 (and the second main wall 22) and that both the side edge portion 14b of the air electrode 14 and the side edge portion 18a of the water-repellent film 18 are interposed between the surrounding portion (support plate) 31 and the first main wall 21 and held from both sides.

As described above, in the sixth embodiment, both the side edge portion 14b of the air electrode 14 and the side edge portion 18a of the water-repellent film 18 are wrapped and covered on three sides by the surrounding portion 31, the side wall 23, and the first main wall 21. This structure can reduce or prevent the electrolytic solution 17 from running along the side edge portion 14b of the air electrode 14 and the side edge portion 18a of the water-repellent film 18 to leak out through the air inlets 24. In this case, integrating the surrounding portion (support plate) 31 with the side edge portion 14b of the air electrode 14 and the side edge portion 18a of the water-repellent film 18 by insert molding can make it more difficult for the electrolytic solution 17 to leak out.

Seventh Embodiment

Figure 10:
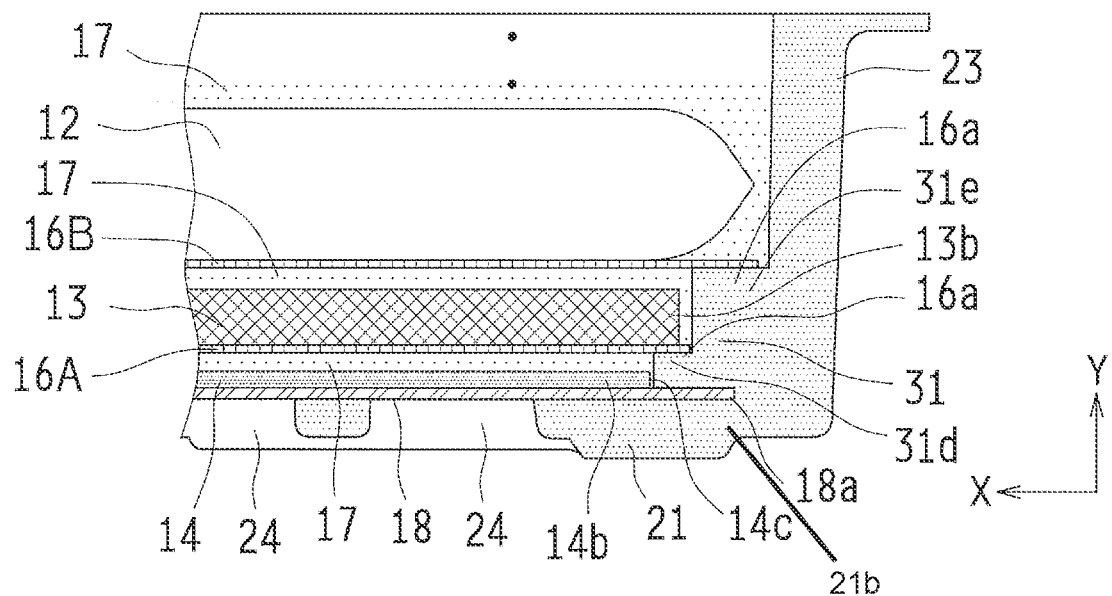
FIG. 10 is a partially enlarged schematic sectional view illustrating the structure of a battery case and the shape of a separator according to a seventh embodiment.

FIG. 10 is a partially enlarged schematic sectional view illustrating the structure of a battery case 20 and the shape of a separator 16 according to a seventh embodiment, i.e., an enlarged schematic sectional view of the circular area indicated by reference sign B in FIG. 2. Although FIG. 10 illustrates only the first main wall 21 side, the second main wall 22 also has the same structure.

The battery case 20 according to the seventh embodiment includes, at a marginal portion 21b (the entire perimeter, in the seventh embodiment) of the first main wall 21 (and the second main wall 22) on which the air electrode 14 is opposingly disposed, the surrounding portion 31 which surrounds the side edge portion 14b of the opposingly disposed air electrode 14.

In the seventh embodiment, the surrounding portion 31 is in the form of a stepped protrusion with multiple steps (two steps in this case) that surrounds only the side surface 14c of the air electrode 14 and that is thicker than the air electrode 14 in the thickness direction Y of the air electrode 14. That is, the surrounding portion (hereinafter referred to as the stepped protrusion) 31 is shaped like a rectangular frame and has a structure that allows the air electrode 14 to fit into the first step portion of the stepped protrusion 31 shaped like a frame.

A first separator 16A disposed opposing the air electrode 14 is formed to be one size larger than the air electrode 14, and when the first separator 16A is disposed opposing the air electrode 14, the marginal portion 16a of the first separator 16A is placed on an upper surface 31d of the first step of the stepped protrusion 31. That is, the air electrode 14 is completely covered by a side wall portion of the first step of the stepped protrusion 31, the first separator 16A, and the marginal portion 16a thereof. The dimensions of the first separator 16A are set such that the first separator 16A, if displaced a little in the battery case 20, will not come off the upper surface 31d of the first step of the stepped protrusion 31.

The oxygen-generating electrode 13 disposed opposing the first separator 16A is also formed to be one size larger than the air electrode 14, and when the oxygen-generating electrode 13 is placed on and disposed opposing the first separator 16A, a marginal portion 13b of the oxygen-generating electrode 13 is placed on the upper surface 31d of the first step of the stepped protrusion 31 and fits into the second step portion. However, the oxygen-generating electrode 13 is preferably formed to be slightly smaller than the first separator 16A.

A second separator 16B disposed opposing the oxygen-generating electrode 13 is formed to be one size larger than the oxygen-generating electrode 13. Therefore, when the second separator 16B is disposed opposing the oxygen-generating electrode 13, the marginal portion 16a of the second separator 16B is placed on an upper surface 31e of the second step of the stepped protrusion 31, as viewed in the drawing plane of FIG. 10. That is, the oxygen-generating electrode 13 is completely covered by a side wall portion of the second step of the stepped protrusion 31, the second separator 16B, and the marginal portion 16a thereof. The dimensions of the second separator 16B are set such that the second separator 16B, if displaced a little in the battery case 20, will not come off the upper surface 31e of the second step of the stepped protrusion 31.

Therefore, if the metal negative electrode 12 is opposingly disposed on the second separator 16B, the oxygen-generating electrode 13 and the metal negative electrode 12 will completely be separated by the second separator 16B and the stepped protrusion 31, and the air electrode 14 and the oxygen-generating electrode 13 or the oxygen-generating electrode 13 and the metal negative electrode 12 will not come into contact with each other to cause short-circuiting if any of the electrodes (the air electrode 14, the oxygen-generating electrode 13, and the metal negative electrode 12) or the first and second separators 16A and 16B are displaced in the battery case 20.

By setting the thicknesses of the steps of the stepped protrusion 31 to be larger than the thickness of the air electrode 14 and the thickness of the oxygen-generating electrode 13, gaps are formed between the air electrode 14 and the first separator 16A and between the oxygen-generating electrode 13 and the second separator 16B, and a layer of the electrolytic solution 17 is formed in each gap. This facilitates diffusion of by-products (ions) of a discharge reaction in the air electrode 14 and thus can reduce resistance during the discharge reaction in the air electrode 14.

By forming the stepped protrusion 31 at the marginal portion 21b of the first main wall 21, the first main wall 21 is reinforced to have higher resistance to internal pressure.

Eighth Embodiment

Figure 11:
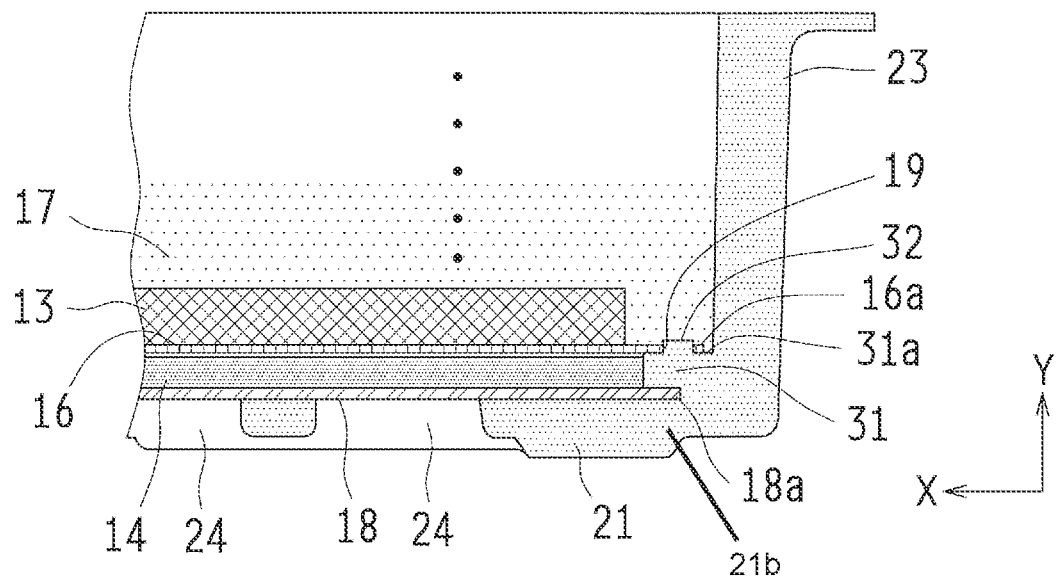
FIG. 11 is a partially enlarged schematic sectional view illustrating the structure of a battery case and the shape of a separator according to an eighth embodiment.

FIG. 11 is a partially enlarged schematic sectional view illustrating the structure of a battery case 20 and the shape of a separator 16 according to an eighth embodiment, i.e., an enlarged schematic sectional view of the circular area indicated by reference sign B in FIG. 2. Although FIG. 11 illustrates only the first main wall 21 side, the second main wall 22 also has the same structure.

While the structure of the battery case 20 according to the eighth embodiment is applied to the structure of the battery case 20 according to the fifth embodiment (see FIG. 8) by way of example, it can also be applied to other first to fourth, sixth, and seventh embodiments.

That is, in the eighth embodiment, a projection 32 for positioning is formed on the upper surface 31a of the surrounding portion 31 in the form of a protrusion, and a hole 19 for positioning is formed at a corresponding location in the marginal portion 16a of the separator 16 placed on the surrounding portion 31, as viewed in the drawing plane of FIG. 11. Due to this structure, when the separator 16 is disposed opposing the air electrode 14, mounting and positioning of the separator 16 can simultaneously be achieved by fitting the hole 19 formed in the marginal portion 16a of the separator 16 with the projection 32 formed on the surrounding portion 31. Since the separator 16 is positioned, displacement is reduced in the battery case 20.

The projection 32 and the hole 19 described above are formed at at least one location in the surrounding portion 31 and the marginal portion of the separator 16 and may be formed at multiple locations as required, for example, two or four locations diagonally opposite to each other or two or four locations on opposite edge portions.

Ninth Embodiment

Figure 12:
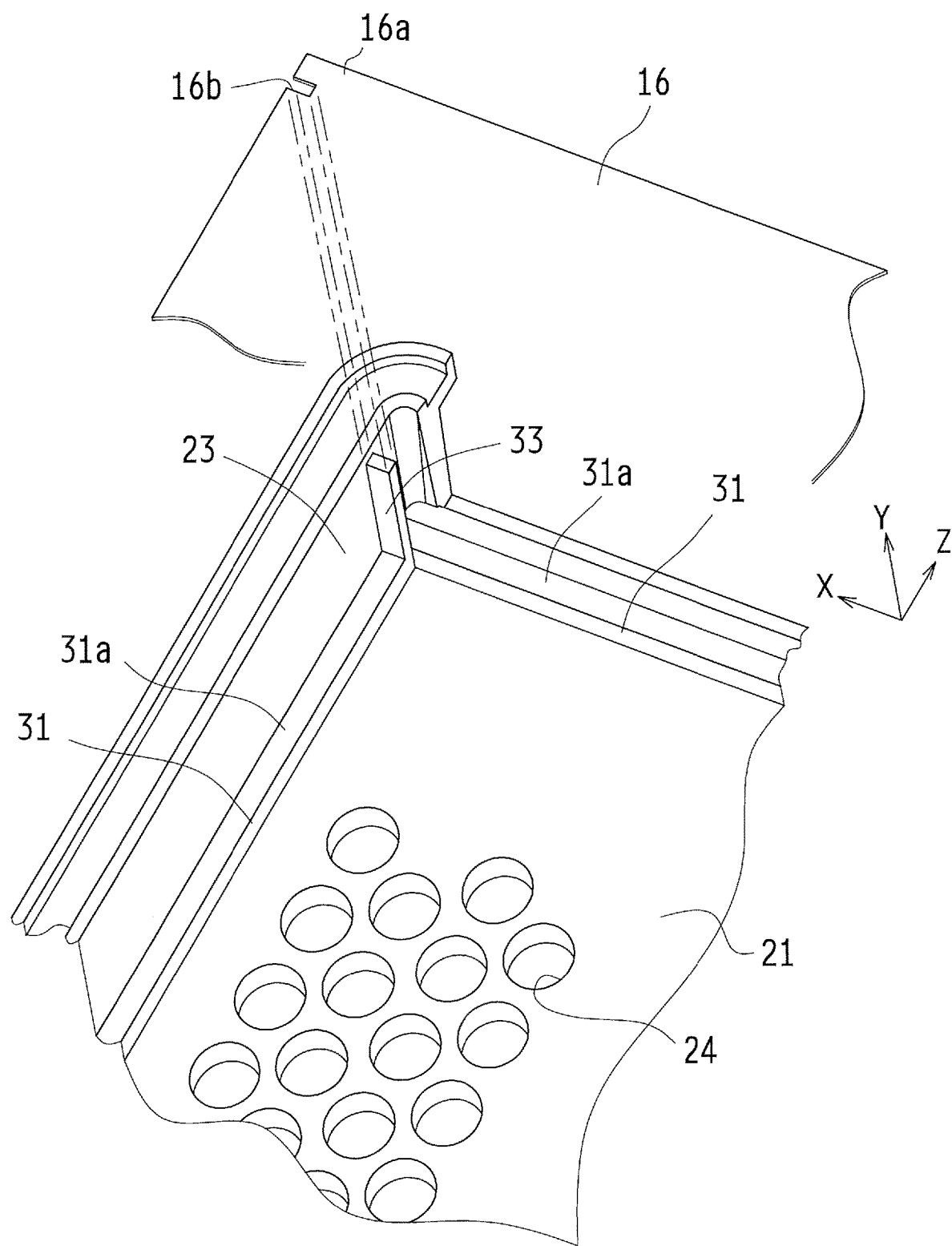
FIG. 12 is a partially enlarged perspective view illustrating the structure of a battery case and the shape of a separator according to a ninth embodiment.

FIG. 12 is a partially enlarged schematic sectional view illustrating the structure of a battery case 20 and the shape of a separator 16 according to a ninth embodiment, i.e., an enlarged schematic sectional view of the circular area indicated by reference sign B in FIG. 2. Although FIG. 12 illustrates only the first main wall 21 side, the second main wall 22 also has the same structure.

While the structure of the battery case 20 according to the ninth embodiment is applied to the structure of the battery case 20 according to the first embodiment (see FIG. 4) by way of example, it can also be applied to other second to eight embodiments.

That is, in the ninth embodiment, a rib piece 33 for positioning is formed on the upper surface 31a of the surrounding portion 31 in the form of a protrusion along the thickness direction Y, and a notch 16b for positioning is formed at a corresponding location in the marginal portion 16a of the separator 16 placed on the surrounding portion 31. Due to this structure, when the separator 16 is disposed opposing the air electrode 14, mounting and positioning of the separator 16 can simultaneously be achieved by fitting the notch 16b formed in the marginal portion 16a of the separator 16 with the rib piece 33 formed on the surrounding portion 31. Since the separator 16 is positioned, displacement is reduced in the battery case 20.

The rib piece 33 and the notch 16b described above are formed at at least one location in the surrounding portion 31 and the marginal portion of the separator 16 and may be formed at multiple locations as required, for example, two or four locations diagonally opposite to each other.

Tenth Embodiment

Figure 13A:
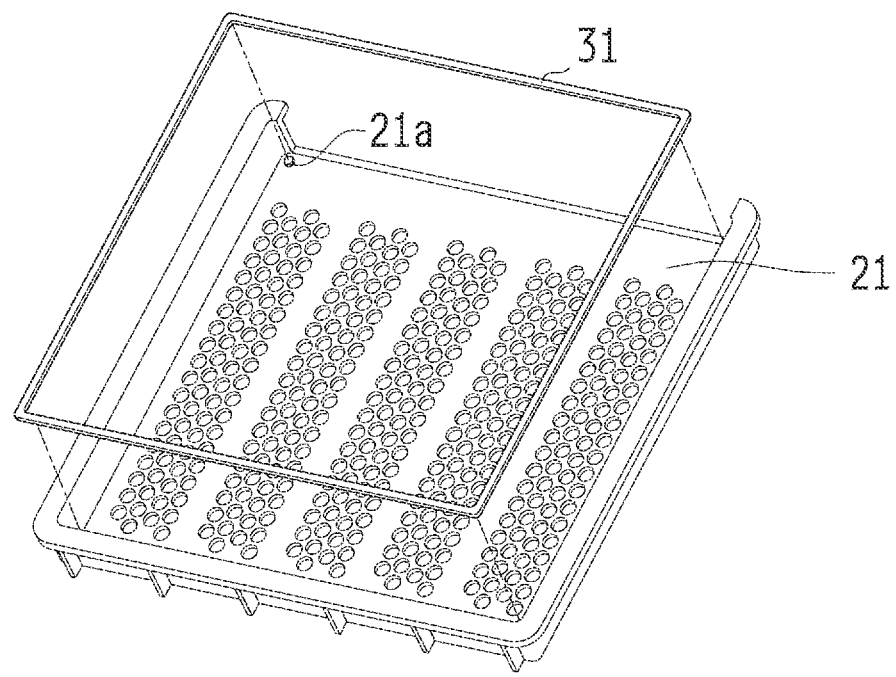
FIG. 13A is a schematic perspective view illustrating the structure of a battery case according to a tenth embodiment.
Figure 13B:
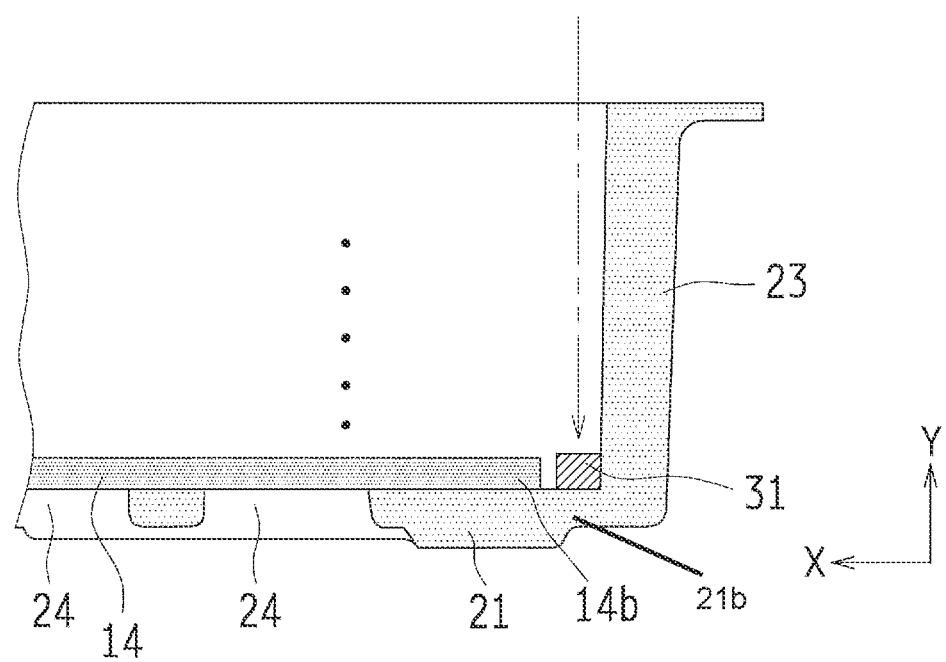
FIG. 13B is a partially enlarged schematic sectional view illustrating the structure of the battery case according to the tenth embodiment.

FIG. 13A is a schematic perspective view illustrating the structure of a battery case 20 according to a tenth embodiment, and FIG. 13B is an enlarged schematic sectional view of a circular area indicated by reference sign D in FIG. 13A. Although FIG. 13A and FIG. 13B illustrate only the first main wall 21 side, the second main wall 22 also has the same structure.

The battery case 20 according to the tenth embodiment includes, at a marginal portion 21b (the entire perimeter) of the first main wall 21 (and the second main wall 22) on which the air electrode 14 is opposingly disposed, a surrounding portion 31 having a shape of a frame body that surrounds the side edge portion 14b of the opposingly disposed air electrode 14. In the tenth embodiment, the surrounding portion 31 having a shape of a frame body and the first main wall 21 of the battery case 20 are separate parts. By fitting the surrounding portion 31, which is a separate part, into the first main wall 21, the surrounding portion 31 is disposed, at the marginal portion 21b of the first main wall 21 on which the air electrode 14 is opposingly disposed, so as to surround the side edge portion 14b of the opposingly disposed air electrode 14, as shown in FIG. 13B.

Reference sign 21a in FIG. 13A indicates a positioning boss for fitting the surrounding portion 31 into the first main wall 21, and the surrounding portion 31 is positioned sandwiched between the side wall 23 and the positioning boss 21a. The positioning boss 21a, while being provided at a single location in a corner in FIG. 13A, may be provided at multiple locations.

When the surrounding portion 31 is a separate part as described above, complexity in change of design and production cost can be reduced without changing the specification of the battery case 20 itself but by using a surrounding portion 31 having a different shape according to a change of the specification of members such as electrodes.

The present disclosure can be embodied in various other forms without departing from the spirit or major features thereof. The embodiments described above are therefore to be considered in all respects as illustrative and not restrictive, the scope of the invention being indicated by the appended claims rather than by the foregoing description, and all changes which come within the meaning and range of equivalency of the claims are intended to be embraced therein.

This international application claims priority from Japanese Patent Application No. 2016-253971 filed Dec. 27, 2016, and the entire contents of Japanese Patent Application No. 2016-253971 are hereby incorporated by reference.

INDUSTRIAL APPLICABILITY

The metal-air battery of the present disclosure can be widely used as a power supply device in various applications.

REFERENCE SIGNS LIST 1 metal-air battery
12 metal negative electrode
12t metal-negative-electrode terminal
13 oxygen-generating electrode
13t oxygen-generating-electrode terminal
14 air electrode
14a air-electrode current collector (collecting electrode)
14b side edge portion (side portion)
14t air-electrode terminal
16 separator (separating film)
16A first separator
16B second separator
16a marginal portion (edge portion)
16b notch
17 electrolytic solution
18 water-repellent film
18a side edge portion (marginal portion)
19 hole
20 battery case
21 first main wall
22 second main wall
23 side wall
24 air inlets (a plurality of holes)
25 crosspiece
26 electrolytic-solution inlet
27 inner lid
28 outer lid
31 surrounding portion (protrusion, support plate)
31a upper surface
31d upper surface of first step
31e upper surface of second step

The invention claimed is:

1. A battery case containing an electrode group including an air electrode and a separator, the battery case comprising:
   a main wall on which the air electrode is opposingly disposed; and
   a surrounding portion that is disposed at a marginal portion of the main wall and that surrounds a side portion of the air electrode,
   the surrounding portion being covered by an edge portion of the separator disposed opposing the air electrode,
   wherein the surrounding portion causes a gap to be formed between the air electrode and the separator disposed opposing each other.

2. The battery case according to claim 1,
   wherein the surrounding portion is a protrusion that surrounds a portion of a side surface of the air electrode and that is thicker than the air electrode in a thickness direction of the air electrode.

3. The battery case according to claim 1, comprising a side wall extending perpendicularly from the marginal portion of the main wall,
   wherein the surrounding portion is a support plate extending from the side wall in parallel to the main wall, and
   the side portion of the air electrode is interposed between the support plate and the main wall.

4. The battery case according to claim 1,
   wherein a plurality of holes are provided in the main wall,
   a water-repellent film is disposed between the plurality of holes and the air electrode, and
   an edge portion of the water-repellent film is held between the surrounding portion and the main wall.

5. The battery case according to claim 1,
   wherein a plurality of holes are provided in the main wall,
   a water-repellent film is disposed between the plurality of holes and the air electrode, and
   an edge portion of the water-repellent film and an edge portion of the air electrode are superposed on each other and held between the surrounding portion and the main wall.

6. The battery case according claim 1,
wherein a portion of an edge portion of the air electrode is thinner than a central part of the air electrode in a thickness direction of the air electrode, and
the portion of the edge portion of the air electrode is held between the surrounding portion and the main wall.

7. The battery case according to claim 1,
wherein the air electrode further includes an air-electrode catalyst layer, and a collecting electrode disposed between the air-electrode catalyst layer and the separator.

8. A metal-air battery comprising:
the battery case according to claim 1;
the air electrode;
the separator; and
a first electrode opposing the separator on an opposite side from the air electrode.

9. The metal-air battery according to claim 8, further comprising
a second electrode opposing the first electrode on the opposite side from the air electrode.

10. The metal-air battery according to claim 8,
wherein the first electrode is a metal negative electrode.

11. The metal-air battery according to claim 9,
wherein the first electrode is a metal negative electrode, and the second electrode is an oxygen-generating electrode.

12. The metal-air battery according to claim 9,
wherein the first electrode is an oxygen-generating electrode, and the second electrode is a metal negative electrode.

* * * * *